(12) United States Patent
Veverka et al.

(10) Patent No.: US 10,350,498 B2
(45) Date of Patent: Jul. 16, 2019

(54) GAMING SYSTEM AND METHOD

(71) Applicant: TMS GLOBAL SERVICES PTY LTD, Brisbane (AU)

(72) Inventors: Mike Veverka, Brisbane (AU); Bradley David Board, Brisbane (AU)

(73) Assignee: TMS GLOBAL SERVICES PTY LTD., Brisbane, Queensland (AU)

( * ) Notice: Subject to any disclaimer, the term of this patent is extended or adjusted under 35 U.S.C. 154(b) by 699 days.

(21) Appl. No.: 14/434,481

(22) PCT Filed: Oct. 9, 2013

(86) PCT No.: PCT/AU2013/001174
§ 371 (c)(1),
(2) Date: Apr. 9, 2015

(87) PCT Pub. No.: WO2014/056037
PCT Pub. Date: Apr. 17, 2014

(65) Prior Publication Data
US 2015/0258451 A1 Sep. 17, 2015

(30) Foreign Application Priority Data
Oct. 12, 2012 (AU) .............................. 2012904480

(51) Int. Cl.
*A63F 13/44* (2014.01)
*A63F 13/79* (2014.01)
(Continued)

(52) U.S. Cl.
CPC ............ *A63F 13/79* (2014.09); *A63F 13/216* (2014.09); *A63F 13/44* (2014.09); *G07F 17/3262* (2013.01); *G07F 17/329* (2013.01)

(58) Field of Classification Search
CPC ........ A63F 13/79; A63F 13/216; A63F 13/44; G07F 17/3262; G07F 17/329
See application file for complete search history.

(56) References Cited

U.S. PATENT DOCUMENTS 6,061,660 A * 5/2000 Eggleston .............. G06Q 30/02
705/14.12
9,594,555 B2 * 3/2017 Walker .............. G06F 17/30879
(Continued)

FOREIGN PATENT DOCUMENTS

WO WO 2009/062187 A1 4/2009
WO WO 2014/056037 A1 4/2014

OTHER PUBLICATIONS

Australian Patent Office, "Search Report" in application No. PCT/AU2013/001174, dated Jan. 29, 2014, 23 pages.

*Primary Examiner* — Jason Skaarup
(74) *Attorney, Agent, or Firm* — Hickman Palermo Becker Bingham LLP

(57) ABSTRACT

The present invention is directed to a system for conducting a game involving a plurality of players. The system includes at least one agent for issuing to each player an entry coupon having a unique identification code; at least one server adapted to receive a request for registration in the game from each player, wherein the request includes the unique identification code from player's coupon; verify that each unique identification code is valid; issue instructions to the players relating to commencement of the game within a predetermined time period; receive a commencement notification from players within predetermined time period; issue series of instructions for each player's completion; receive confirmation from each player on completion of instruction; calculate for each player the total time to complete the series of instructions; and select the game winner based on the time taken for each player to complete the series of instructions.

20 Claims, 3 Drawing Sheets

(51) Int. Cl.
*G07F 17/32* (2006.01)
*A63F 13/216* (2014.01)

(56) References Cited

U.S. PATENT DOCUMENTS

| | | | | |
|---|---|---|---|---|
| 2003/0177347 A1* | 9/2003 | Schneier | A63F 13/12 | 713/151 |
| 2006/0020512 A1* | 1/2006 | Lucas | G06Q 30/02 | 705/14.15 |
| 2006/0082056 A1* | 4/2006 | Kane | G07F 17/32 | 273/138.1 |
| 2007/0093299 A1* | 4/2007 | Bergeron | G07F 17/32 | 463/43 |
| 2009/0089131 A1* | 4/2009 | Moukas | G06Q 10/0631 | 705/70 |
| 2009/0104960 A1* | 4/2009 | Kelly | G07F 17/3267 | 463/16 |
| 2009/0197684 A1* | 8/2009 | Arezina | G07F 17/3216 | 463/42 |
| 2011/0105212 A1* | 5/2011 | Fiechter | G07F 17/32 | 463/17 |
| 2012/0123568 A1* | 5/2012 | Pollard | A63F 3/081 | 700/91 |
| 2012/0214571 A1* | 8/2012 | Oakes | G07F 17/32 | 463/17 |
| 2013/0211889 A1* | 8/2013 | Hanina | G06Q 30/02 | 705/14.11 |
| 2013/0237304 A1* | 9/2013 | Oakes | G07F 17/32 | 463/16 |
| 2013/0252686 A1* | 9/2013 | ONeill | G07F 17/3237 | 463/16 |
| 2013/0346452 A1* | 12/2013 | Lee | G06F 17/30557 | 707/805 |
| 2014/0370975 A1* | 12/2014 | Coronel | A63F 13/69 | 463/25 |
| 2015/0336010 A1* | 11/2015 | Wiederkehr | A63F 13/85 | 463/42 |
| 2016/0132161 A1* | 5/2016 | Kalb | G06F 3/048 | 463/31 |

* cited by examiner

GAMING SYSTEM AND METHOD

This application is a U.S. National Stage Patent Application filed under 35 U.S.C. § 371 of International Patent Application No. PCT/AU2013/001174, filed 9 Oct. 2013, which claims priority to Australia application 2012904480, filed 12 Oct. 2012, the entire contents of all of which are hereby incorporated by reference as if fully set forth herein for all purposes.

TECHNICAL FIELD

The present invention relates to gaming including lottery, keno, bingo and scratch cards. In particular, although not exclusively, the present invention relates to a lottery system and method in which player participation is enriched.

BACKGROUND ART

Lottery is a form of gaming which involves the drawing of numbers for a prize. Some lottery players are creatures of habit and play the same combination of lottery numbers week after week. Indeed, given the habitual nature of most players, they will not only tend to play the same combination of numbers but they will also tend to have a regimented pattern to their purchasing of game entries. Once the player forms a purchasing behaviour, it can often be difficult to entice the player to alter their behaviour.

To entice players to alter their purchasing habits, lottery promoters employ various promotional techniques. One of the more common forms of promotion utilised to increase entry sales are promotional draws where the jackpot is increased for a specific draw, which entices players to purchase additional entries for a chance to obtain a large payoff. While these promotions temporarily increase sales, players quickly return to their normal playing regime.

The applicant has perceived that the formation of a player's playing habits stems from the monotony of game play with there being little to no player interaction with the game after selection of their numbers. Outside the potential payoff, there is little in the way to keep the player engaged with the game or to spark the player's interest.

Clearly it would be advantageous to provide a lottery system which provides for a greater level of player interaction. It would also be advantageous to provide a system and method for enhancing lottery play as well as increasing lottery revenues.

SUMMARY OF INVENTION

Accordingly in one aspect of the present invention there is provided a system for conducting a game involving a plurality of players, the system including:
 a plurality of agents for issuing to each player within the plurality of players an entry coupon, each coupon having a unique identification code;
 at least one server adapted to:
  receive a request for registration in the game from each player within the plurality of players, wherein the request for registration includes the unique identification code from each player's coupon;
  verify that each unique identification code is valid;
  issue on confirmation of registration of each of the player's instructions to the players relating to commencement of the game within a predetermined time period;
  receive a commencement notification from each player within predetermined time period;
  issue to each player in response to receipt of the commencement notification series of instructions for each player's completion;
  receive confirmation from each player on completion of each instruction within the series of instructions;
  calculate for each player the total time to complete the series of instructions; and
  select the game winner based on the time taken for each player to complete the series of instructions.

The plurality of agents may be a select group of agents within a geographical location such as a town, city, county/shire/burrow, postal/zip code, state etc. Suitably, the plurality of agents are lottery agents or authorised lottery outlets.

The entry coupon may be provided as a bonus game on the purchase of a specific lottery product or lottery entry. Alternatively, the coupon may be provided as a standalone product which a potential player must purchase in order to take part in the game. Suitably, the unique identification code includes a portion identifying the game number and game date. The unique identification code preferably includes a portion containing a randomly-generated alphanumeric sequence. The randomly-generated alphanumeric sequence may be generated on issue of the ticket. Alternatively, the alphanumeric sequence is selected from a pool of sequences provided by the game organiser. Preferably, the unique registration code is only valid for a predetermined time period with the player having to obtain a new code for inclusion in subsequent games.

In one embodiment of the present invention, the request for registration may involve the player completing an online registration form. Suitably, the player is required to provide personal details such as mobile/cell phone number, email address, home address, age, gender, social media preferences, etc. In addition to the provision of personal information, the player may also be required to provide details surrounding the issue of the entry coupon i.e. location of agent where the entry was obtained, lottery game purchased to obtain entry etc.

Suitably the server verifies the validity of the unique identification code by comparing the code provided by the player against a listing of all current codes within the system. The listing of codes may be compiled at the printing of the entry coupons; in such cases the agents upload into the system the identification code associated with each entry coupon as it is issued. Alternatively, the listing of current registration codes may be provided by each agent on a periodic basis. In the case where the unique code includes a randomly-generated alphanumeric sequence, the system is configured to prohibit printing of an entry coupon containing a duplicate sequence.

The confirmation of registration may include the provision of a coupon containing a QR code for scanning on game commencement. Suitably, the scanning of the QR code produces the commencement notification. Alternatively, the commencement notification may be generated as part of the player's response to a message from the server at the start of play. The message may be in the form of an email, SMS, MMS or the like and may require the user to respond to the message via a blank reply or 'yes' or 'no' response. Alternatively, the message may contain a hyperlink which on activation directs the player to the game's website for provision of the instructions.

Suitably, the series of instructions are a set of clues which direct each player to a specific location within a gaming area. Each clue within the set of clues may require the player to identify a specific item within the location with which the clue is associated. In each case, the player may be required to scan a QR code or to swipe/scan an NFC tag or the like to register completion of the clue. In some embodiments of the invention, the player may be required to scan or swipe multiple tags or codes within selected specific locations in order to complete the clue. Preferably, the each instruction in the series of instructions is provided to each player sequentially on completion of the preceding instruction in the series. In some embodiments of the present invention players may be directed to specific clue locations by the provision of GSP co-ordinates or GPS way-points. In such instances the player may then be provided with a specific task to complete at a location via location specific content being provided to their portable computing device through location based services The calculation of the total time for each player to complete all the instructions involves calculating the time between completion of the first instruction and completion of the last instruction in the series of instructions. Alternatively, the total time for each player to complete all the instruction involves calculating the time between receipt of the commencement notification and the completion of the last instruction in the series of instructions.

Suitably, the player with the fastest time is selected as the winner. Alternatively, the selection of the winner may involve selecting a sub-set of players within the plurality of players having a finishing time within a predetermined finishing time and randomly selecting a player from the sub-set of players as the winner.

In one embodiment of the present invention the players may be provided with updates on the progress of other players in the game via social media. Suitably, as part of the registration process, the players are required to follow social media sites associated with the game i.e. the game's Facebook page, twitters feed, Google+ page etc. for details on the game.

In one embodiment of the present invention, the system may be configured to issue the series of instructions and receive player responses via a dedicated application installed by the players onto their computing device (i.e. laptop, tablet, iPad, iPod, smartphone or other such portable computing device) during the registration process or pushed to the user's portable computing device once registration is complete. In such instances, the application may be utilised to provide information on promotions etc. occurring within the player's current position within the gaming area.

In yet another aspect of the present invention, there is provided a method for conducting a game involving a plurality of players, the method including the steps of:
  issuing each player within the plurality of players an entry coupon, each coupon having a unique identification code;
  receiving at a server a request for registration in the game from each player within the plurality of players, wherein the request for registration includes the unique identification code from each player's coupon;
  verifying that each unique identification code is valid;
  issuing on confirmation of registration of each of the player's instructions to the players relating to commencement of the game within a predetermined time period;
  receiving a commencement notification from each player within predetermined time period;
  issuing to each player in response to receipt of the commencement notification a series of instruction for each player's completion;
  receiving confirmation from each player on completion of each instruction within the series of instructions;
  calculating for each player the total time to complete the series of instructions; and
  selecting the game winner based on the time taken for each player to complete the series of instructions The reference to any prior art in this specification is not, and should not be taken as an acknowledgement or any form of suggestion that the prior art forms part of the common general knowledge.

BRIEF DESCRIPTION OF DRAWINGS

In order that this invention may be more readily understood and put into practical effect, reference will now be made to the accompanying drawings, which illustrate preferred embodiments of the invention, and wherein.

DESCRIPTION OF EMBODIMENTS

Figure 1:
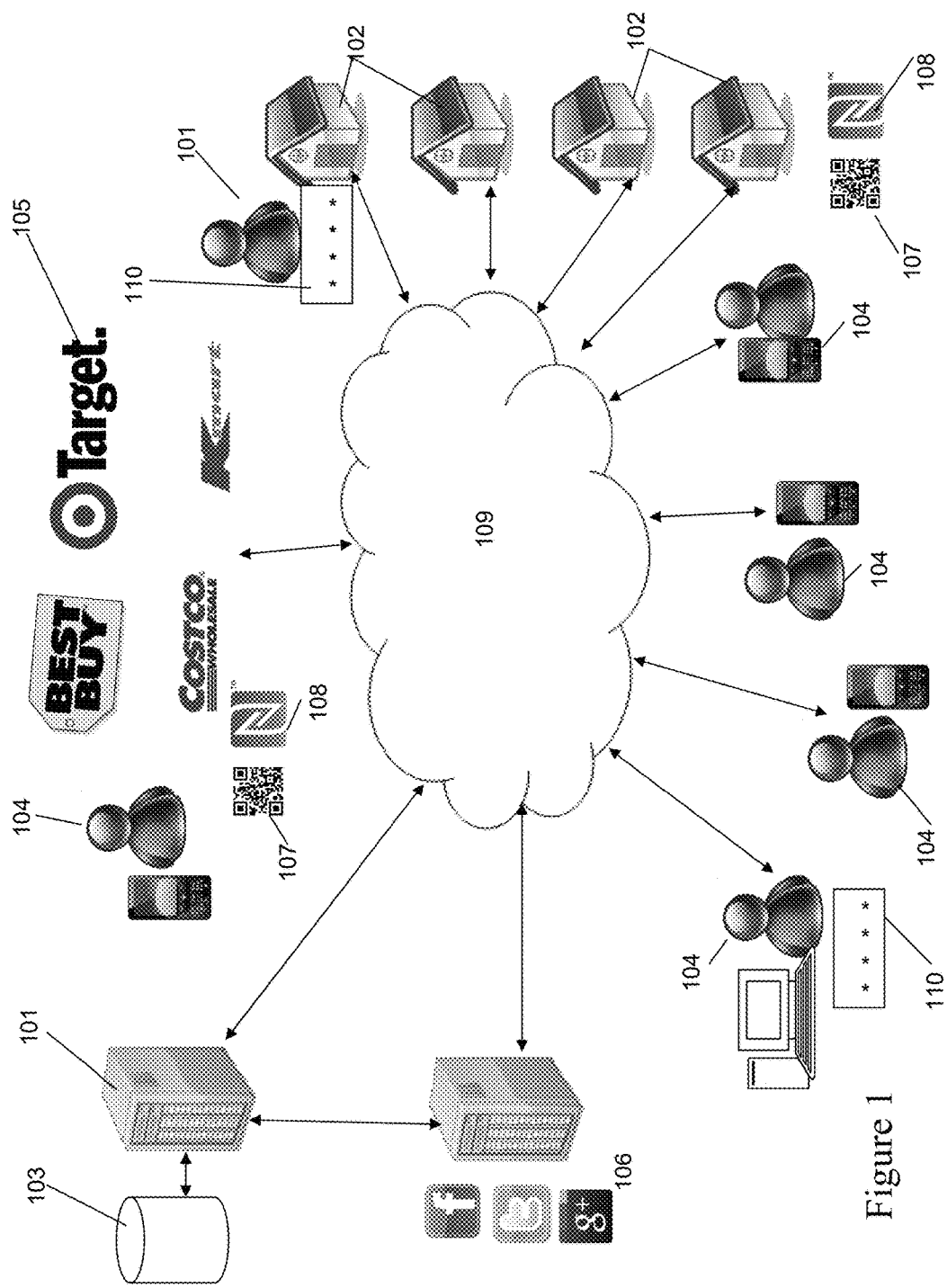
FIG. 1 is a schematic diagram of a gaming system according to one embodiment of the present invention.

With reference to FIG. 1, there is illustrated one possible configuration of a gaming system 100 according to one embodiment of the present invention. The gaming system in this central server 101 is coupled to a plurality of gaming agents 102 such as a lottery retailer or agent (e.g. lottery booth at state or county fair etc.) via communications network 109. The server 101 includes a database 103 which maintains a listing of registration details for each player 104 and retail outlets 105 like a big box store which has stores state wide may wish to promote the lottery and sponsor the treasure hunt and provide prizes; for example Target, Best Buy etc. currently participating in the game.

The game played across the system in this particular example is a treasure hunt. In order to participate in the game, players 104 are required to visit a gaming agent 102 to obtain an entry into the hunt. The entry may be via a direct purchase of the entry i.e. a game provided as a standalone paid game where the prize pool is determined as a percentage of the total sales for the given game. Alternatively, the entry may be provided as a result of an entry into another lottery game i.e. an entry provided as a free bonus game to the player; in such cases, the prizes are funded by other means e.g. from marketing and promotional budgets of the organising entity, unpaid prizes from state lotteries, sponsors etc.

On receipt of the entry 110, the player is provided with a unique registration number. The player may then be required to log onto a gaming website to register to play. The particulars relating to the player are then recorded along with the registration number in the database 103. The server 101 may then provide the player with details of the game; i.e., the date of the treasure hunt and the location(s). For example, the date and time of the treasure hunt is from 7:00 am to 7:00 pm on Saturday Jul. 21, 2012 at all (state) lottery retailers 102 and non-lottery retailer 105 who have elected to be involved in the treasure hunt. This information could be provided directly to the player via email, SMS, MMS, electronic coupon (for printing) with QR code for scanning to commence the game. Alternatively, the user could be directed to a third party website or services 107 such as Facebook, Google+, Twitter, YouTube, Flickr, digital hang-outs or the like where they can access the game details.

In addition to providing initial details relating to the game, the use of social media sites in this instance will also be utilised as a platform to the formation of an on-line community of players to enhance game play. For example, the use of social networking sites such Facebook or Google+ players can engage in community chatter prior to and during the game providing a level of interaction with other players. To further enhance the completive nature of the game, players could be provided with updates through Twitter, SMS or other short messaging platforms of the progress of other players during the course of the game. Social media services could then also be utilised by the game organiser to maintain player interest in the game post play periods by posting various results pictures etc. of the winners, etc. This would also provide an avenue for players to comment (i.e. bragging rights) and chat with other players or newcomers to maintain the buzz surrounding the game.

Prior to the game commencing, each participating retailers 102, 105 receive physically or electronically point of sale material to indicate that they are a participant in the treasure hunt. Such point of sales material may be in the form of printed or electronic displays which may display a QR code or the like which must be scanned to complete the given location. In addition to the use of QR codes 107, the system may also utilise Near Field Communication (NFC) enabled devices which the player must swipe with their NFC enabled device 108 to complete the selected location. In the case where NFC devices 108 are employed, the user may be required to complete a task specific to the location i.e. to find a particular product, the user may then be required to snap of photograph of the product which can then be beamed back to the central server on tapping the NFC device at the location to transfer the required data denoting completion of the task for the given location.

In some embodiments of the present invention players may be directed to specific clue locations by the provision of GSP co-ordinates or GPS way-points. In such instances the player may then be provided with a specific task to complete at a location via location specific content being provided to their portable computing device through location based services As in the case of traditional treasure hunt games, the players are provided with a series of clues to guide them from location to location within the game. As noted above, players on registering to play, are provided with the time and date at which play commences and the locations of the participating businesses. Depending on the clue distribution model, there are a number of ways in which players may participate in the game; for example, where the player is provided with a coupon bearing a QR code 107 at the start of play. On scanning the code, a message is sent to the central server 101 which then logs time at which the code was scanned (player start time). The server may then provide the player with their first clue with each subsequent clue being provided once the player has solved the previous clue. Under this model, players are required to sequentially complete clues in order to receive the next clue. To avoid a rush of players at one given location, players are provided with differing clue lists i.e. players start with different clues within the listing of clues on the system. The selection of the initial clue for the player could be based on a number of factors such as the player's current location, age, purchasing habits or other such demographic information relating to the player. Alternatively, the player may be provided with a complete listing of the clues allowing the player to solve the clues in any order.

As noted above, the players are required to solve the clues by snapping a QR code 107 or the like or interacting with a dedicated NFC device/tag 108 at a given location. For example, the player may be provided with a first clue which is a number e.g. 20,000,000. This would lead the player to the nearest participating lottery agent 102 to find the Jackpot sign displaying the jackpot amount of $20,000,000 or $20 Million. If the Jackpot sign has a QR code or NFC tag, the player will scan or snap the code or tag to enter the find. On scanning or snapping the code 107 or tag 108 by a player, the server is advised and the find recorded against the unique game registration number associated with the player. The record of the find includes a time stamp verifying the time at which the find was made by the player. If the clue distribution is on a clue by clue basis, the player will send the find to the computer system where it is and the player will be sent the next clue. If the clues have been distributed as a set to the player, the player continues to find the remaining objects and send them to the system once all of the objects have been found.

As discussed above, the use of NFC tags 108 enables the game to include a series of tasks which a player may be required to complete during their time at a particular location. For example, the location may include a series of tags which the user is required to find. Once all the tags have been scanned, the task is complete and the central server again logs the completion of the clue for the given location before providing the next clue to the player. Alternatively, the player could be required to take a picture of a sign or item and upload the photo as proof of the find. The addition of a task within a given location is of additional benefit to the retailer/agent, while game play is designed to drive players to a location to increase the likelihood of impulse purchasing, having players hunt round the store for specific products or deals may result in a return visit to the location i.e. players pushed for time may return to the store to take advantage of an offer seen during play. Additionally, the inclusion of an in-store mini hunt enables player to become familiar with a retailer and its products, potentially resulting in a repeat visit to the store.

Once a player has collected the objects by scanning the relevant QR codes and/or NFC tags the completed entry will be validated and eligible for prize consideration. The prize allocation method determined by the lottery operator i.e., the 1st prize may be awarded to the entry that found the objects in the fastest time, followed by the second best time being awarded the 2nd prize etc. Alternately, as an example, the first 10 entries received may be entered into a separate draw to determine the winner and subsequent prize awards.

While the above discussed example contemplates entry into the game via web registration of the unique identifier, it will of course be appreciated by those of skill in the art that the game registration and play could be delivered in a variety of manners. For example, the gaming system may utilise a dedicated application which is installed by the players onto their computing device (i.e. laptop, tablet, iPad, iPod, smartphone or other such portable computing device) during the registration process or pushed to the user's portable computing device once registration is complete. In order to play the game, the user opens the application which opens a secure data channel to the central server. This enables the server to push clues directly to the user during game play. In addition, the use of a dedicated application improves security for the player as information capture during game play is only accessed by the application (i.e. users personal data isolated form application). The use of an application also provides for a marketing opportunity to the game organiser as the application could be configured to display various promotions running in the location the player has been directed to.

Figure 2:
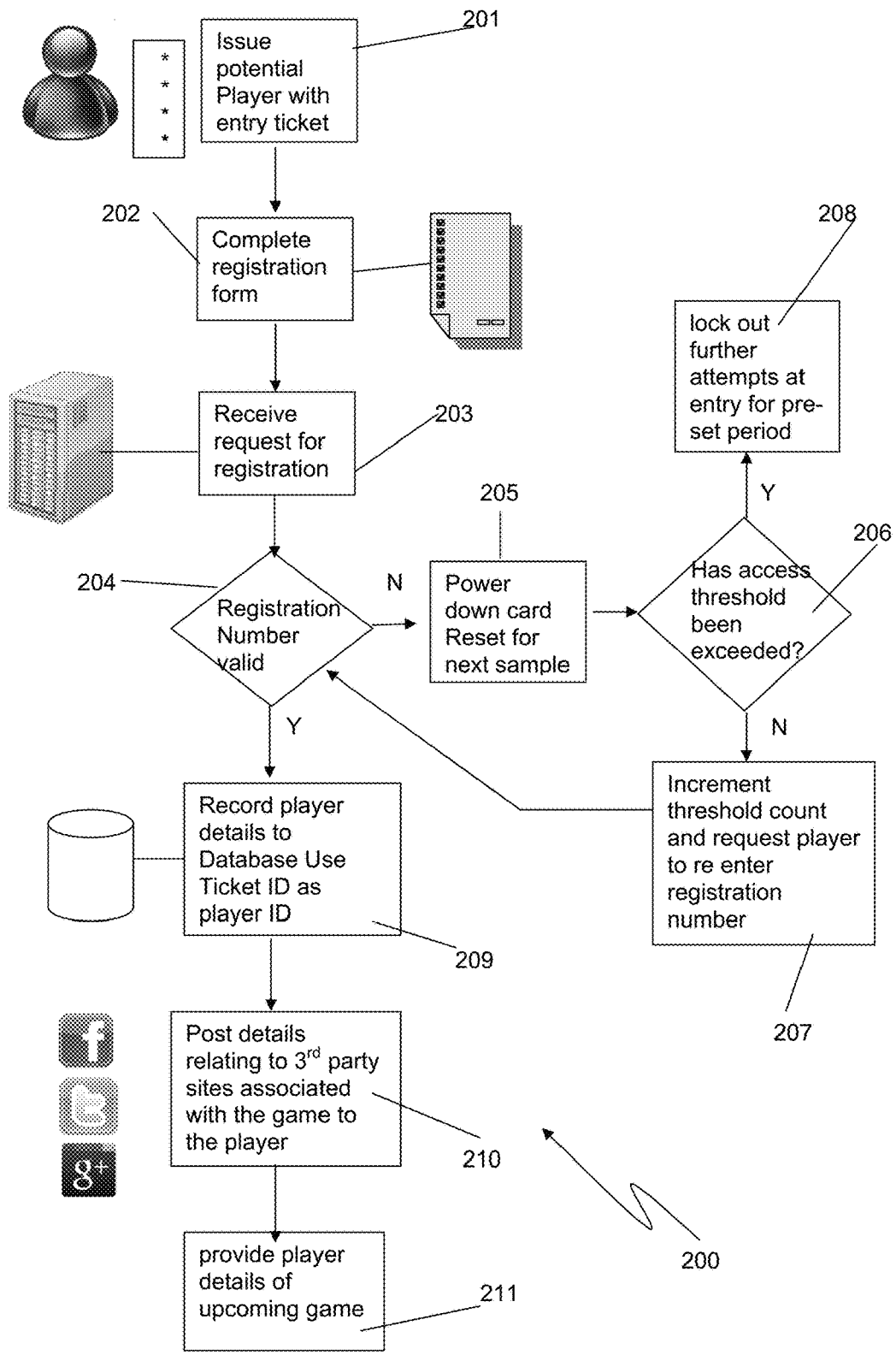
FIG. 2 is a flow chart depicting the process of player registration according to one embodiment of the present invention.

FIG. 2 depicts the process of player registration 200 for game play with the gaming system of FIG. 1 according to one embodiment of the present invention. As noted above, the prospective player is issued with an entry 201 into the game, the entry bearing a unique registration number. The prospective player must then register the entry with the game organiser. To register, the potential player is required to access a website to fill in an entry form 202 which captures various particulars of the player. To complete the form, the player is required to enter the registration number on the entry. On completion, the form is submitted 203 to the game organiser where the central server then proceeds to validate the registration number 204.

In the event that the registration number is invalid, the server sends back an error message 205 advising the player that the registration number is invalid. The server then proceeds to check the number of attempts 206 made by the player to submit the registration details. If the number of attempts by the player does not exceed a pre-set threshold, the player is requested to re-enter the registration number 207. The server then proceeds to validate 204 the entered registration code. In the event that the threshold is exceeded at step 206, the server locks out the player from attempting further registrations for a pre-set period 208. Validating the registration code in this manner avoids the potential for double registrations and allows for instances of miss-prints on the entry (i.e. smudging or blurring of portions of code) or a miss-read or miss-entry by the player.

Once the server has verified the registration number, it stores the player's details in the database for future game play 209 with the player ID being the registration number. Once the details of the player are recorded, the server can then advise the player of one or more third party sites (e.g. Facebook, twitter, Google+ etc.) 210 associated with the game to encourage the player to become involved in the games online community. The server then proceeds to provide the player with details regarding the upcoming game via the web interface. The server also sends these details to the player via email, SMS etc 211.

In one embodiment of the present invention, the player may be required to print off a coupon having a QR code or the like once registration is complete. In such instances, the details of the game are sent to the player via the web interface and other messaging platforms containing instructions to print the coupon as well as instructions of when to scan the coupon to receive their clue/s on commencement of the game.

Figure 3:
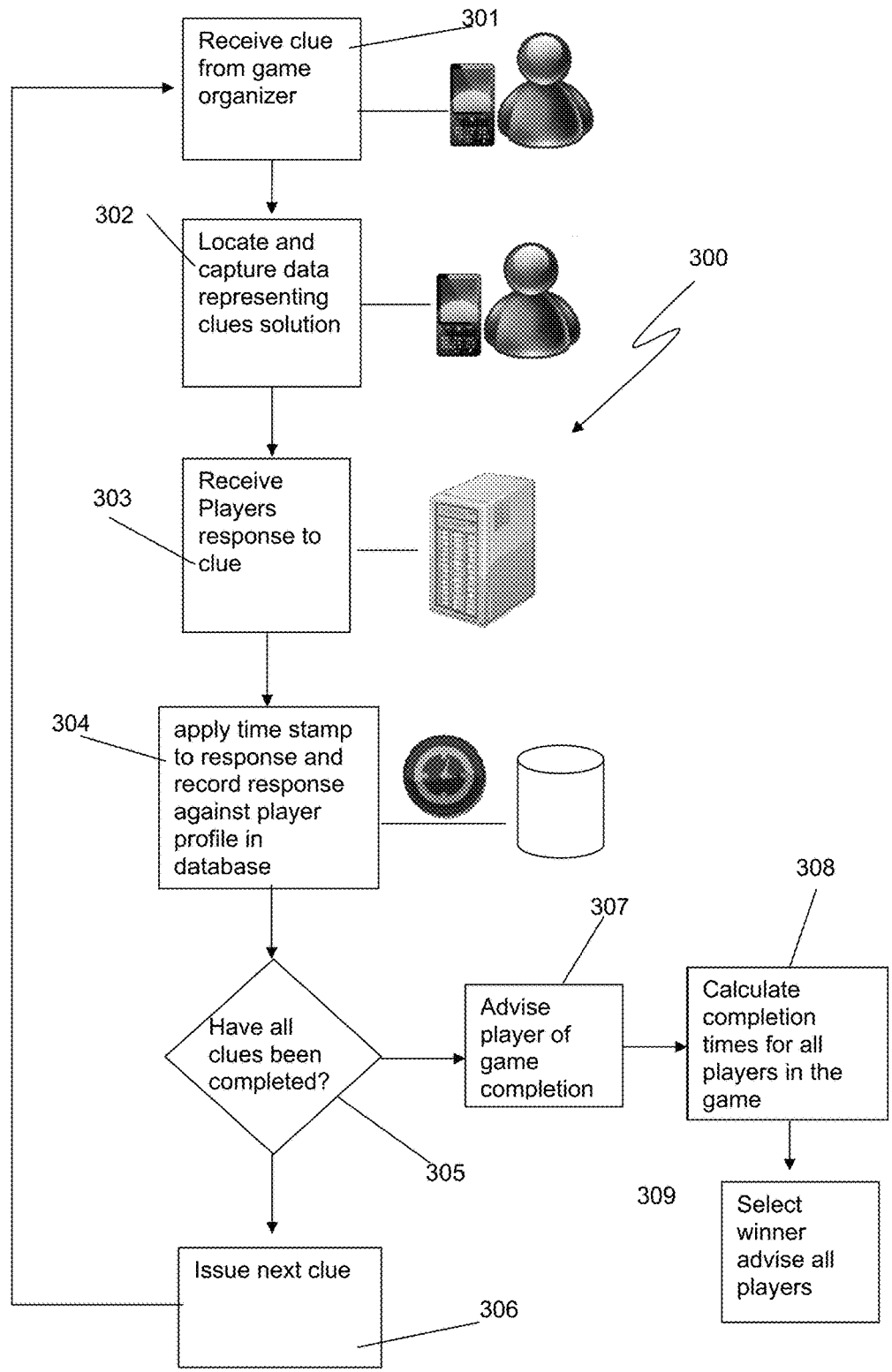
FIG. 3 is a flow chart depicting a method of playing a game with the gaming system of FIG. 1 in accordance with one embodiment of the present invention.

FIG. 3 depicts the process of game play according to one embodiment of the present invention. To commence play, the player is sent a clue or a listing of clues 301, as discussed above. The first clue could be sent in response to the player activating play by scanning a QR code on a coupon. Alternatively, the user could be sent the first clue on commencement of the game. The time taken for the user to complete the game could then be calculated from successful completion of the first clue.

On receipt of the clue, the player must then locate the appropriate store and display etc. within the store being the solution to the clue. On identifying the solution, the player is then required to scan a QR code, swipe/tap an NFC tag or snap a photo of the display etc. to verify that they have found the solution to the clue 302. In the case of a QR code or NFC tag being utilised, the player's interaction with these would send a verification message to the server 303 which on receipt of the massage logs the time 304 (time stamps the find) at which the player scans the code or tag before recording the find against the player's profile which is associated with the player's registration code. In the case where the player is required to take a photo, the player will need to upload the photo to the server to log the find. In such instances, the time stamp on the digital photo could be used to verify the time of the find.

Once the server has logged the find it then determines if the player has completed all the clues (i.e. check to see if the clue was the last clue) 305. In the event that the clue was not the last clue the server proceeds to issue the next clue 306 and await the player's response 302. If the clue was the last clue in the game then the server notifies the player that they have completed the game 307. The server then proceeds to calculate the completion times for each player involved in the game 308 and based on the calculated time server then selects a winner of the game 309. As noted above, selection of the winner may be the selection of the fastest finisher or it could involve the selection of a plurality of players finishing within a specified time with the winner randomly selected from this group of players.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A system for conducting a game involving a plurality of players, the system comprising:
　at least one agent computational device for issuing to each player within the plurality of players an entry coupon, each entry coupon having a unique identification code;
　at least one player computational device for communicating with at least one server, the player computational device including a QR code reader, NFC scanner or a camera;
　at least one server adapted to:
　　receive a request for registration in the game from each player within the plurality of players, wherein the request for registration includes the unique identification code from each player's entry coupon;
　　verify that each unique identification code is valid;
　　issue on confirmation of registration of each of the players, instructions to the players relating to commencement of the game within a predetermined time period;
　　receive a commencement notification from each player within predetermined time period;
　　issue to each player in response to receipt of the commencement notification a series of instructions for each player's completion;
　　receive a confirmation of completion from each player on completion of each instruction within the series of instructions, wherein the confirmation of completion includes completion information, including a completion timestamp, wherein the completion timestamp is logged at the time of reading a QR code, scanning a NFC tag or taking a photograph using the camera at a location using the at least one player's computational device;

calculate for each player the total time to complete the series of instructions using the completion timestamps; and select the game winner based on the time taken for each player to complete the series of instructions.

2. The system of claim 1 wherein the at least one agent is selected from a group of agents within a geographical region.

3. The system of claim 1 wherein the entry coupon is provided as a promotional bonus on the purchase of a specific product from the at least one agent within the plurality of agents.

4. The system of claim 1 wherein the unique identification code comprises a portion identifying the game and a game date.

5. The system of claim 1 wherein the unique identification code comprises a portion containing a randomly generated alphanumeric sequence.

6. The system of claim 1 wherein the unique identification code includes a unique registration code and the unique registration code is only valid for a predetermined time period and wherein each player is required to obtain a new code for inclusion in subsequent games.

7. The system of claim 1 wherein the server verifies the validity of the unique identification code by comparing the code provided by the player against a listing of all current codes within the system.

8. The system of claim 7 wherein the agent compiles a listing of all current codes in real-time on issuance of each entry coupon.

9. The system of claim 7 wherein the agent compiles a listing of all current codes on a periodic basis.

10. The system of claim 1 wherein the agent sends the entry coupon to the player as part of the confirmation of registration, the entry coupon contains a QR code for scanning on game commencement and wherein the scanning of the QR code produces the commencement notification.

11. The system of claim 1 wherein each instruction in the series of instructions is sequentially sent to the player on completion of the preceding instruction in the series.

12. The system of claim 11 wherein the series of instructions are a set of clues for directing each player to a specific location within a gaming area.

13. The system of claim 12 wherein each clue requires the player to identify a specific item within the location with which the clue is associated.

14. The system of claim 13 wherein each clue requires the player to scan a QR code or to swipe/scan an NFC tag to register completion of the clue.

15. The system of claim 13 wherein each clue requires the player to scan or swipe multiple tags or codes within selected specific locations in order to complete the clue.

16. The system of claim 1 wherein the calculation of the total time for each player to complete all the instruction comprises calculating the time between completion of the first instruction and completion of the last instruction in the series of instructions.

17. The system of claim 1 wherein the selection of the winner includes selecting a sub-set of players within the plurality of players having a finishing time within a predetermined finishing time and randomly selecting a player from the sub-set of players as the winner.

18. The system of claim 1 wherein the request for registration involves the player completing an online registration form.

19. The system of claim 1 wherein the server provides players with updates on the progress of other players in the game via social media.

20. A method for conducting a game involving a plurality of players, the method comprising:

issuing, from at least one agent's computational device, each player within the plurality of players an entry coupon, each entry coupon having a unique identification code;

communicating, from at least one player's computational device, with at least one server, the computational device including a QR code reader, NFC scanner or a camera;

receiving, by the at least one server, a request for registration in the game from each player within the plurality of players, wherein the request for registration includes the unique identification code from each player's entry coupon;

verifying, by the at least one server, that each unique identification code is valid;

issuing, by the at least one server, on confirmation of registration of each of the players instructions to the players relating to commencement of the game within a predetermined time period;

receiving, by the at least one server, a commencement notification from each player within a predetermined time period;

issuing, by the at least one server, to each player in response to receipt of the commencement notification a series of instructions for each players completion;

receiving, by the at least one server, a confirmation of completion from each player on completion of each instruction within the series of instructions, wherein the confirmation of completion includes completion information, including a completion timestamp, wherein the completion timestamp is logged at the time of reading a QR code, scanning a NFC tag or taking a photograph using the camera at a location using the at least one player's computational device;

calculating, by the at least one server, for each player the total time to complete the series of instructions using the completion timestamps; and selecting, by the at least one server, the game winner based on the time taken for each player to complete the series of instructions.

* * * * *